United States Patent [19]
Cao et al.

[11] Patent Number: 5,230,044
[45] Date of Patent: Jul. 20, 1993

[54] ARBITRATION APPARATUS FOR SHARED BUS

[75] Inventors: Xi-Ren Cao, Acton; Mohammad V. Abidi; Nii Quaynor, both of Shrewsbury; Fernando Colon-Osorio, Stow, all of Mass.

[73] Assignee: Digital Equipment Corporation, Maynard, Mass.

[21] Appl. No.: 547,569

[22] Filed: Jul. 2, 1990

[51] Int. Cl.5 .................. G06F 13/00; G06F 13/40
[52] U.S. Cl. ................ 395/325; 364/DIG. 1; 364/242.92; 364/238; 364/264; 364/264.6; 364/264.5
[58] Field of Search ................................ 395/325

[56] References Cited

U.S. PATENT DOCUMENTS

| | | | |
|---|---|---|---|
| 4,199,663 | 4/1980 | Herzog | 370/85 |
| 4,320,467 | 3/1982 | Glass | 364/900 |
| 4,395,710 | 7/1983 | Einolf, Jr. | 340/825.5 |
| 4,466,096 | 8/1984 | Heins et al. | 370/85 |
| 4,471,481 | 9/1984 | Shaw et al. | 370/85 |
| 4,494,113 | 1/1985 | Yamaoka et al. | 340/825.5 |
| 4,560,985 | 12/1985 | Strecker et al. | 340/825.5 |
| 4,630,264 | 12/1986 | Wah et al. | 870/85 |
| 4,689,785 | 8/1987 | Toyonaga et al. | 370/85 |
| 4,757,460 | 7/1988 | Bione et al. | 364/514 |
| 4,787,033 | 11/1988 | Bomba et al. | 395/325 |
| 4,799,052 | 1/1989 | Near et al. | 340/825.5 |
| 4,807,223 | 2/1989 | Wells | 370/85 |
| 4,972,313 | 11/1990 | Getson, Jr. et al. | 395/325 |

FOREIGN PATENT DOCUMENTS

80/01025  11/1979  PCT Int'l Appl.

OTHER PUBLICATIONS

European Search Report, EP 91 30 5978 done on Jun. 30, 1992.

Primary Examiner—Eddie P. Chan
Attorney, Agent, or Firm—A. Sidney Johnston; Barry N. Young

[57] ABSTRACT

An improved arbitration technique for a computer network system in which multiple nodes communicate using a shared bus. Each node in the system is assigned an initial arbitration number, N+1, where N is the node number assigned to the node. The arbitration number is the number of quiet slots a node must count before trying to transmit on the system bus. The length of a quiet slot is determined by a particular system's electrical characteristics. Each node in the system monitors a carrier signal on the system bus, the presence of which indicates that a node is transmitting on the bus. Upon detecting the absence of the carrier signal, each node in the system begins to count quiet slots. Every time a node counts an additional quiet slot, it checks to see if the count matches its arbitration number. If the two values are equal, the node checks to see if it has a transmit request, and begins to transmit a message on the system bus if a transmit request is present. If a node detects the presence of the carrier signal before the number of counted quiet slots equals its arbitration number, a different node has won the arbitration for the system bus. All other nodes therefore stop counting quiet slots and change their arbitration numbers. The arbitration number is changed by subtracting from a node's arbitration number either the number of quiet slots counted by a winning node or the node number of the winning node, and performing modulo (M) on the result, where M is the number of nodes in the system.

7 Claims, 4 Drawing Sheets

| I | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| C(I) | 12 | 13 | 14 | 15 | 16 | 17 | 2 | 3 | 4 | 5 | 6 | 7 | 8 | 9 | 10 | 11 |

FIG. 5

FIG. 6

ARBITRATION APPARATUS FOR SHARED BUS

FIELD OF THE INVENTION

This invention relates to computer systems having nodes communicating through a bus, and more particularly to an arbitration apparatus for determining which node transmits next on the bus.

BACKGROUND OF THE INVENTION

A computer system may have a number of nodes communicating with each other through a bus. The nodes may be individual computers, controllers for mass storage devices, or other computer apparatus. A problem arising in such a system architecture is the problem of determining which node transmits next on the bus. For example, a first node may be presently transmitting a message on the bus. Upon the conclusion of that transmission, there may be several nodes seeking to begin transmission. If more than one node begins transmission at the same time, say at the completion of the transmission of the first node, then a data collision will occur. The problem of determining which node transmits next on a shared, multiple access, bus is termed the "arbitration problem".

A solution to the arbitration problem must satisfy at least three requirements: the first requirement is that the arbitration must substantially prevent data collisions; the second requirement is that the arbitration must be "fair", meaning that each node must have an equal opportunity to gain access to the bus for transmission of messages originating in that node; and the third requirement is that the arbitration solution must be "efficient", meaning that the time spent in arbitration should be minimized, as the time spent in arbitration detracts from the available bandwidth of the bus.

A solution to the arbitration problem for a shared bus is set forth in U.S. Pat. No. 4,560,985, entitled "Dual-Count, Round-Robin Distributed Arbitration Technique for Serial Buses" issued to Strecker, Buzynski, and Thompson, on Dec. 24, 1985, referred to hereinafter as the "Strecker et al." patent.

The solution to the arbitration problem disclosed by the Strecker et al. patent, substantially prevents collision of data transfers onto a shared bus, and is fair. The solution disclosed in the Strecker et al. patent requires that each node monitor the bus for a carrier signal in order to determine if the bus is free. And the absence of a carrier signal indicates that no other node is transmitting a message on the bus, and the bus is therefore free. Upon detecting that the bus is free, that is that no carrier signal is detected on the bus, each node begins counting a sequence of predetermined time intervals. The predetermined time interval is referred to as a "quiet slot". The time length of a quiet slot is determined by the speed of the interface electronics and the maximum time of travel of a signal on the bus. Upon detection of no carrier on the bus, a node desiring access to the bus waits a predetermined number of quiet slots. If the predetermined number of quiet slots elapses without another node's carrier being detected, then the node desiring access begins to transmit. For each node, two values of the number of predetermined quiet slots are provided, one high slot countdown number (and, hence, low priority) and one low slot countdown number (and, hence, high priority). Each node is assigned a unique "node number".

The low countdown number is $N+1$ quiet slots, where N is the node number. The high slot countdown number is $N+M+1$ quiet slots, where M is the maximum number of nodes attached to the bus.

Initially, when an exemplary node begins arbitration, it counts $N+M+1$ number of quiet slots, the high count number of quiet slots. If the countdown is interrupted by another node winning the arbitration, that is by the exemplary node detecting a carrier, then the exemplary node determines the node number of the winning node. When the winning node has a higher node number than the exemplary node, the exemplary node retains an $N+M+1$ countdown. If the winning node has a lower node number, the exemplary node changes to an $N+1$ countdown when the bus once again becomes free. As a result of the arbitration, when several nodes are competing for the bus, the node having the lowest countdown number wins the bus.

As each node wins the bus, the M number is added to its countdown value. Thus in order to win the bus again for a subsequent message transmission, it must count down $N+M+1$ quiet slots.

Thus, each competing node has a turn at the bus, starting with the lowest numbered node and going to the highest.

The arbitration apparatus disclosed by the Strecker et al. patent both substantially prevents data collisions from transmissions of different nodes desiring access to the bus, and provides substantially fair access to the bus for all nodes.

However, the apparatus taught by the Strecker et al. patent is inefficient in the use of bandwidth. Several situations arise in which inefficient use of bandwidth is particularly noticeable. One such situation is in the transmission of many short messages by a plurality of nodes. The time spent by the bus carrying messages is small compared with the time spent counting quiet slots. Another situation resulting in inefficient use of bandwidth is where a particular node desires to transmit a very long message and the length of the message exceeds the maximum length allowed by the bus protocol, and no other node desires to transmit on the bus. The node desiring to transmit the long message must, according to the bus protocol, break that message into a series of shorter message transmissions. In this situation, the node must count $N+M+1$ number of quiet slots between the end of one transmission and the beginning of the next transmission. And requiring the node to count this number of quiet slots leaves the bus idle for an excessive length of time, thereby unnecessarily reducing the available bandwidth of the bus.

SUMMARY OF THE INVENTION

The problem of providing a fair arbitration apparatus using only a small amount of time for arbitration, so as to give efficient use of bus bandwidth, is solved by the present invention. An improved arbitration apparatus for a computer network of the type having a plurality of communicating nodes, the nodes communicating by a shared bus, and arbitration apparatus located in each node, is provided by: assigning to each node an initial arbitration count number; means, in each node, for testing for a carrier signal on the bus, the presence of the carrier signal indicative that another node is transmitting on the bus; means, responsive to an absence of the carrier signal on the bus, for counting a number of predetermined time intervals, each predetermined time interval hereinafter referred to as a "quiet slot", and for comparing a number of counted quiet slots with the arbitration count number for the node; and means, responsive to the number of counted quiet slots equaling the arbitration count number, for beginning transmission of a message on the bus. Also, a means, responsive to a node winning an arbitration, changes the arbitration count number of each node of the plurality of nodes.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 4, comprising 4A, 4B and 4C is a state diagram of an arbitration apparatus using the invention.

DETAILED DESCRIPTION

Figure 1:
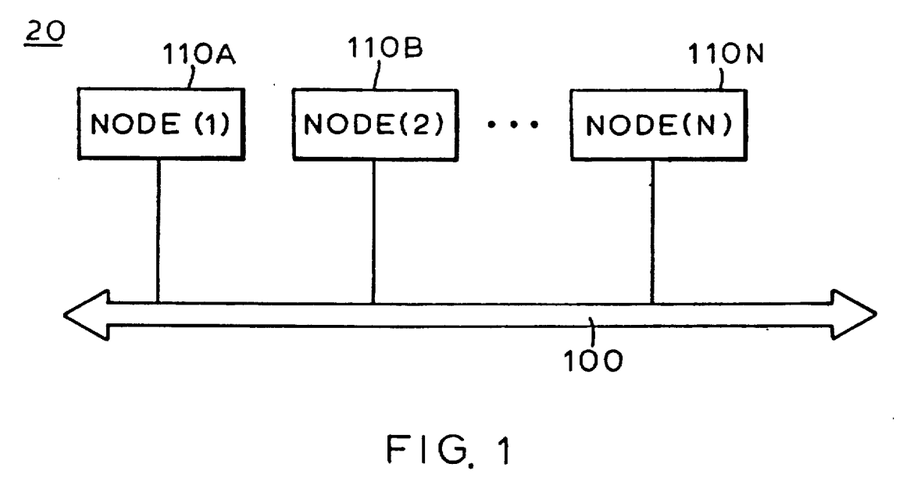
FIG. 1 is a logical block diagram of a computer system using the invention.

FIG. 1 is a logical block diagram of a computer system 20 having a bus 100, and nodes 110A, 110B through 110N. Nodes 110A, . . . 110N communicate through communication signals transmitted on bus 100.

Figure 2:
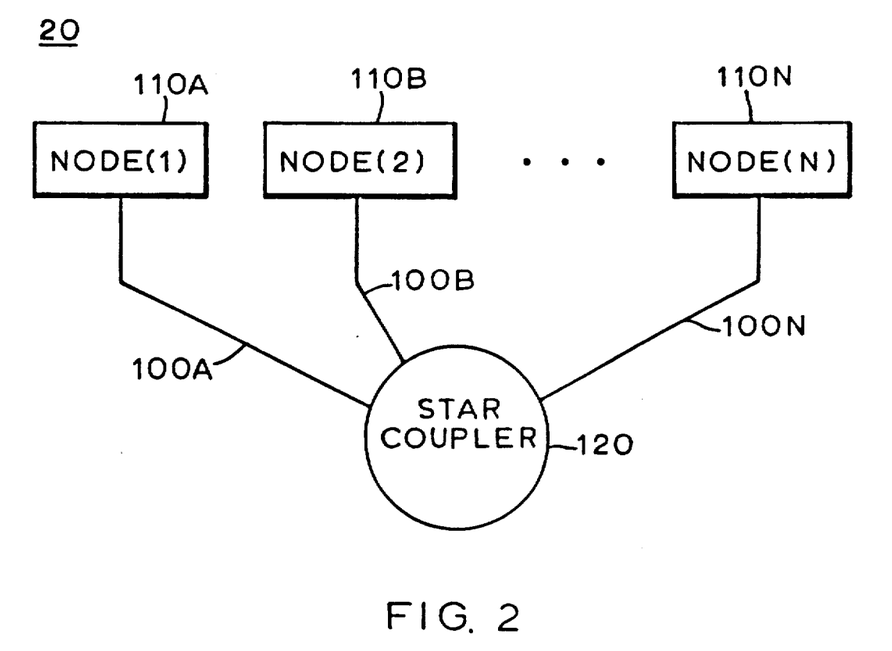
FIG. 2 is a physical block diagram of a computer system using the invention.

FIG. 2 is a physical block diagram of computer system 20 and bus 100. Connections 100A, 100B, through 100N connect their respective nodes to a star coupler 120. The star coupler provides communication interconnection between connections 100A, . . . 100N, thereby providing a pathway for nodes 110A, . . . 100N, to communicate. For example, bus 100 may be an electrical co-axial cable, and star coupler 120 may be an impedance matching network for interconnecting the co-axial cables. In the event that a first node, say node 110A, desires to transmit a message to another node, say for example node 110B, then node 110A transmits its message through bus 100 to all nodes connected to bus 100. The message contains an address which only node 110B recognizes. Accordingly, node 110B internally adjusts itself to receive the message. Other nodes may receive all of the message or part of the message, depending upon the protocol adopted at the node.

A problem in communications between nodes, is that all nodes transmit on the same bus 100, and so if two nodes begin their transmission at the same time, their transmissions will become garbled on the bus. A data "collision" occurs when two nodes transmit messages simultaneously. A process of arbitration for the bus must be adopted for dealing with data collisions on the bus.

A common solution to the data collision problem that has been adopted for the ETHERNET communications pathway is for each node to look for a "carrier" signal on the bus before it begins transmission.

The ETHERNET protocol is set out in IEEE Standard 802.3 and the ISO CSMA/CD Standard (CSMA/CD stands for Carrier Sense Multiple Access/Collision Detection).

Under the ETHERNET protocol, in the event that the node finds no carrier on the bus, it then begins transmission.

Also under the ETHERNET protocol, in the event that the node detects another node's carrier on the bus, a number of strategies may be adopted to reduce data collision and congestion on the bus. For example, a node may begin transmitting immediately upon sensing that no carrier is present on the bus. Alternatively, a node may wait a random amount of time before beginning a transmission after first detecting that there is no carrier on the bus. However, these solutions may lead to data collisions on the bus because two nodes may test the bus at substantially the same time, and then may begin transmitting their messages at substantially the same time without realizing that the other node is transmitting. However, a node is capable of detecting the fact that a data collision is occurring.

After a node detects that a data collision is occurring, then the node takes corrective action depending upon the protocol that is adopted. For example, a node, after detecting a data collision, may use the exponential backoff protocol. In the exponential backoff protocol, a node waits a random amount of time before attempting to re-transmit the message that was ruined by the data collision. And if a second data collision occurs, the nodes involved then double the time interval from which the random time is chosen. If subsequent collisions occur, then the nodes keep doubling the time interval from which the random time is chosen until no data collision occurs.

Figure 3:
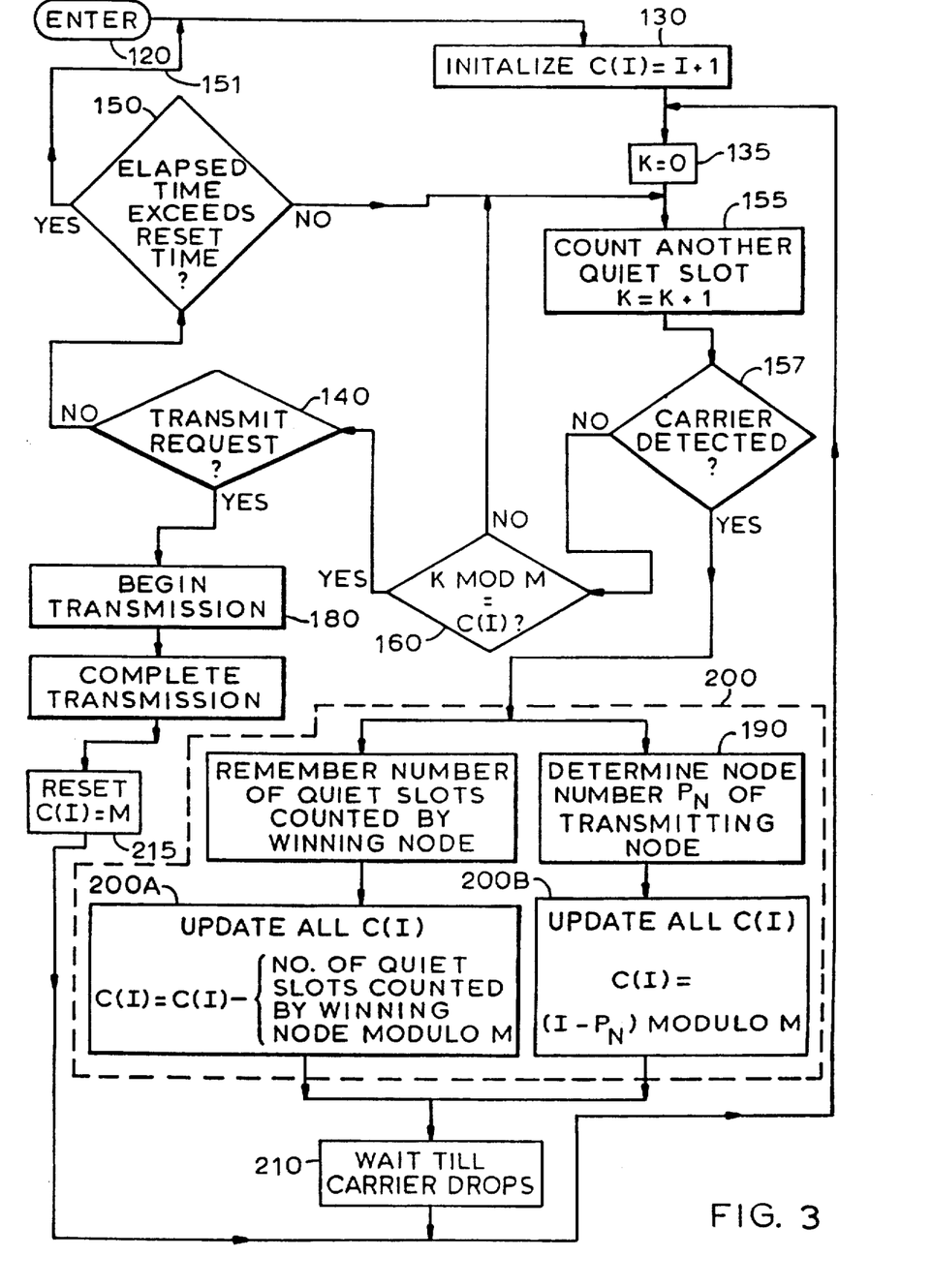
FIG. 3 is a flow chart showing one embodiment of the invention.

The invention is an arbitration method which permits the nodes to communicate on a bus 100 with a very small probability of data collision. FIG. 3 is a flow diagram showing the invention. Each node is assigned a node number represented by the letter I. Additionally, each node is assigned an arbitration count number C(I), where the (I) indicates that the arbitration count number is assigned to node number I.

The computer system including bus 100 and nodes 110A, 110B, . . . 110N must be initialized before operation begins. At initialization the nodes are each assigned an initial arbitration count number C(I). As shown in FIG. 3, at initialization a system begins at ENTER block 120. The system immediately proceeds to initialization block 130 wherein the arbitration count number C(I) for each node is initially assigned the value of I + 1. That is, node No. 1 is assigned arbitration count number 2, node No. 2 is assigned arbitration count number 3, . . . etc.

The node then proceeds to block 135 where the value of the "quiet slot" counter K is initially set to zero. K will hold the value of the number of quiet slots elapsed since carrier was last detected on the bus.

A quiet slot is a predetermined length of time. The node is required to count a number of quiet slots equal to the arbitration count number of the node before the node can begin transmitting. If the count is interrupted by the node's detecting the carrier from another node, then the node does not transmit.

The time length of a "quiet slot" is selected on the basis of the speed of interface electronics in the nodes and the length of time required for an electrical signal to propagate from a first node to a second node where the nodes are separated by the maximum length of the bus. For example, if the separation between the most widely separated nodes is 100 meters and the speed of an electrical pulse on the bus is approximately 0.2 meters per nanosecond, then a quiet slot may be chosen to be approximately 500 nanoseconds plus the response time of the interface electronics used in each node.

In an embodiment of the apparatus incorporating the Strecker, et al. disclosures and sold by the assignee of this patent, a star coupler physical arrangement as shown in FIG. 2 is used, all connection cables 100A . . . 100N are cut to a defined length of 45 feet, and a quiet slot is chosen to be 1.14 microseconds. The value of 1.14 microseconds takes into account both the propagation time as illustrated above, and the speed of the interface electronics.

After block 135 the system proceeds to block 155 where the node waits for one quiet slot and updates the count K to K+1. After this the system proceeds to block 157 where it tests the bus for the presence of a carrier.

In the event that a carrier is not detected at block 157, the system proceeds to block 160 wherein a test is made to determine if it is this node's turn to transmit. This test is done by comparing the number of quiet slots counted, K modulo M against the arbitration count number C(I). If the two are equal then the node assumes that it has the turn to transmit, and proceeds to block 140 to check if it has a transmit request. In the event that K modulo M does not equal the arbitration count C(I), the node returns to block 155 and continues to count quiet slots.

At block 140 if the system detects a transmit request, it proceeds to block 180 where it begins transmitting its message on bus 100. Following completion of transmission, the node resets its arbitration count to M, as shown in block 215, and returns to block 135 to again start the quiet slot count.

At block 140 if no transmit request is detected, the system moves to block 150 wherein an elapsed time counter is tested to determine if the time elapsed, since a transmit request was received, exceeds a "reset time". The reset time is a predetermined value. In the event that the time interval has exceeded the reset time, then the system is reinitialized along path 151. In a practical system, the reinitialization may be achieved by the node transmitting a "reset message" over the bus. Since each node receives all messages transmitted on the bus, each node in the system will be able to reset its arbitration count on receipt of the reset message.

In the event that at block 157 a carrier is detected, the system proceeds to block 190 where a determination of the node number of the transmitting node is made. This determination is possible because each node receives all messages transmitted by all nodes, and a protocol adopted by the system requires that a header portion of a message contain the address of the transmitting node. Each node can interpret the header produced by the transmitting node to make the determination, shown in block 190, of the node number of the transmitting node.

The system then proceeds to block 200 where the arbitration count number of each node is updated. Block 200A shows the first alternative embodiment of updating the arbitration count number. Block 200B shows a second alternative embodiment of updating the arbitration count number.

After block 200, the system proceeds to block 210 wherein the nodes go into a wait state until the carrier on the bus ceases, following which the system returns to block 135 and arbitration starts again.

First Alternative Embodiment

Figure 4A:
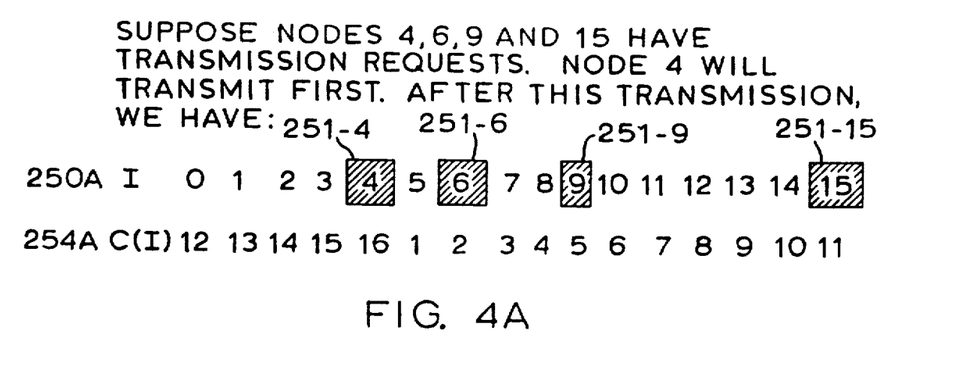
Figure 4B:
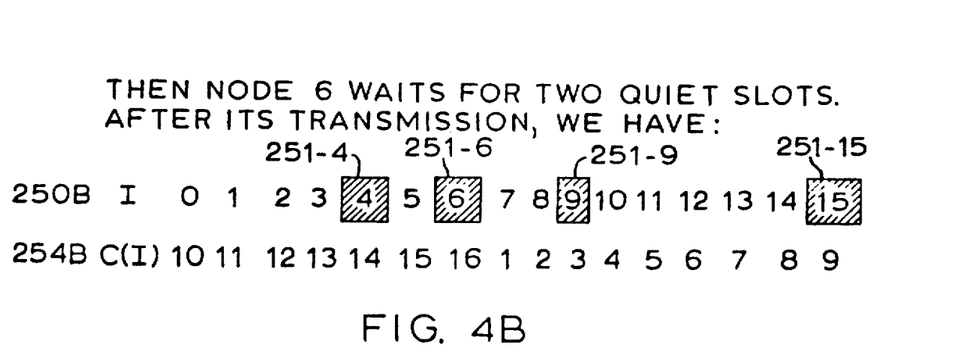
Figure 4C:
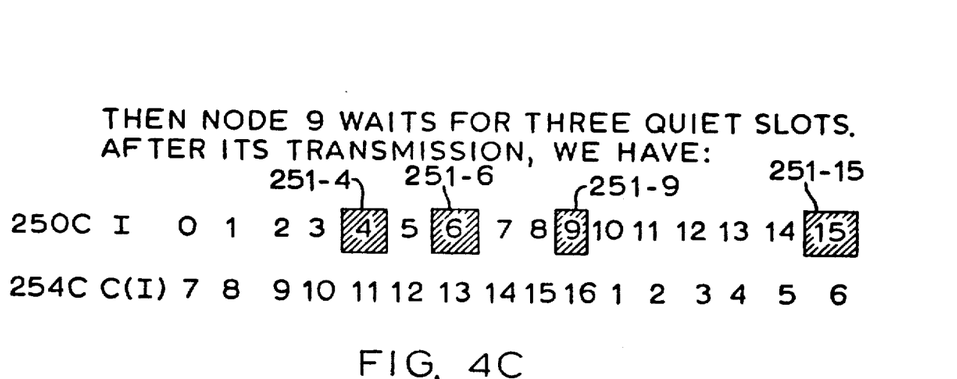

FIG. 4A, FIG. 4B, and FIG. 4C show an example of the invention. In the example, it is assumed that there are 16 nodes in the system, and node numbers are assigned 0-15. The figures show a sequence of events, and those events represent transmission by various nodes onto bus 100. Suppose that nodes 4, 6, 9 and 15 have transmission requests. FIG. 4A shows the nodes as represented by numbers 250A, where numbers 250A are indicated with an I. The nodes are numbered 0, 1, 2, 3, . . . 15. That is, block 140 as shown in the flow diagram of FIG. 3 will answer "yes" for each of these nodes.

As shown in block 200A, a first alternative method of updating the arbitration count number is for each node to use the number of quiet slots counted by the winning node. It is easy for each node to use the number of quiet slots counted by the winning node because each node knows how many quiet slots it counted before losing the arbitration to the winning node. Each node then subtracts the number of counted quiet slots from its arbitration count number C(I), modulo M, in order to obtain its arbitration count number. The arithmetic may be expressed by the modulo M equation:

$$C(I) = (C(I) - \text{(Number of Quiet Slots Counted by the Winning Node)}) \text{ Modulo } M$$

if C(I) is not equal to the number of quiet slots counted by the winning node. and, $$C(I) = M$$

if C(I) is equal to the number of quiet slots counted by the winning node.

The nodes are initialized by each node being assigned an arbitration count number equal to its node number plus one.

FIG. 4A, FIG. 4B, FIG. 4C illustrate the process of nodes counting the number of quiet slots counted by the winning node, in order for each node to compute its new arbitration count number. In the example shown in FIG. 4A . . . FIG. 4C, suppose nodes 4, 6, 9, and 15 have pending transmission requests. Node 4 transmits first. After node 4 transmits, the assignment of arbitration count numbers is as shown in FIG. 4A. Node 5 has arbitration count number equal 1 (C(5)=5−4=1), node 6 has its arbitration count number equal 2 (C(6)=6−4=2), and so forth through node 15 which has arbitration count number (C(15)=15−4=11) 11, and node 3 has arbitration count number (C3)=(3−4) modulo 16=15) 15. Accordingly, after node 4 finishes its transmission, each node detects the absence of carrier on bus 100, and so each node begins counting quiet slots. Node 5 counts 1 quiet slot, and since node 5 has no pending transmission request, node 5 passes the opportunity to transmit on bus 100. Node 6 counts the first quiet slot and also a second quiet slot, node 6 has a pending transmission request, and so upon counting quiet slot number 2, node 6 begins transmission on bus 100. Also node 9 counted 2 quiet slots before losing the arbitration to node 6, and node 15 also counted 2 quiet slots before losing the arbitration to node 6. Accordingly, node 9 subtracts 2 from its present arbitration count number of 5 in order to compute a new arbitration count number of 3, and node 15 subtracts 2 quiet slots from its old arbitration count number of 11 in order to compute a new arbitration count number of 9, all as shown in FIG. 4B.

As further shown in FIG. 4B, upon the completion of transmission by node 6, node 7 has arbitration count number 1, node 8 has arbitration count number 2, node 9 has arbitration count number 3 and node 15 has arbitration count number 9, and node 6 has arbitration count number 16. All of the arbitration count numbers shown in FIG. 4B were computed from the arbitration count number shown in FIG. 4A by subtracting 2 quiet slots, modulo 16, from the arbitration count numbers shown in FIG. 4A Upon the completion of transmission by node 6, each node detects the absence of carrier on bus 100 and begins counting quiet slots. Node 7 counts 1 quiet slot and passes the opportunity to transmit since it has no transmission request pending. Also, node 8, after counting 2 quiet slots, passes up the opportunity to transmit since it has no pending transmission request. Node 9 has a pending transmission request, and after counting 3 quiet slots begins transmitting on bus 100. All of the other nodes remember that the winning node counted three quiet slots, and subtract, using modulo 16 arithmetic, from the arbitration count number shown in FIG. 4B. For example, node 15 subtracts 3 quiet slots from its arbitration count number 9 as shown in 4B, in order to compute its new arbitration count number 6 as shown in FIG. 4C.

FIG. 4C shows the arbitration count numbers as computed after the completion of transmission by node 9. The arbitration count numbers shown in FIG. 4C were computed from the arbitration count numbers shown in FIG. 4B by subtracting the 3 quiet slots counted by node 9 from the arbitration count number shown in FIG. 4B. Accordingly, node 15, which had an arbitration count number of 9 as shown in FIG. 4B, obtains an arbitration count number of 6 after completion of the transmission by node 9.

Upon completion of the transmission by node 9, each node begins counting quiet slots, and after each node counts 6 quiet slots, node 15 begins transmission since it was the first node having a pending transmission request.

In summary of the first alternative embodiment of the method of updating the arbitration count number, each node uses the number of quiet slots counted by the winning node, and subtracts the number of winning quiet slots from its old arbitration count number in order to compute its new arbitration count number.

Second Alternative Embodiment

A second alternative method of updating the arbitration count numbers for each node is to subtract the node number, Pn, of the transmitting node from the node number I using modulo (M) arithmetic. M is the number of nodes attached to bus 100. Each node determines the node number Pn of the transmitting node by interpreting the header of messages that are transmitted. Since bus 100 is a shared multiple access bus, each node receives all messages that are transmitted.

For example, in the event that there are 32 nodes attached to bus 100, and that node 5 is detected to be transmitting on the bus, then upon completion of the transmission by node number 5: node number 6 will be assigned arbitration count number (6−5=1) 1; node number 13 will be assigned arbitration count number (13−5=8), giving a new arbitration count number of 8; and node 5, the last node to transmit, will have its arbitration count number set to 32, the highest arbitration count number, making it wait the longest number of quiet slots to begin a second transmission, thereby giving all of the other nodes a chance to transmit first.

Updating the arbitration count number C(I) of each node I can be expressed by the following modulo M equation where Pn is the node number of the currently transmitting node:

$$C(I) = (I - Pn) \text{ Modulo } (M) \quad \text{if } I \text{ not equals } Pn.$$
$$C(I) = M \quad \text{if } I \text{ equals } Pn.$$

Once again FIG. 4A, FIG. 4B, and FIG. 4C can be used to illustrate updating the arbitration count number of a node I. Once again, the system is assumed to have 16 nodes, and nodes 4, 6, 9, and 15 are assumed to have pending transmission requests.

FIG. 4A shows the arbitration count numbers C(I), 254A, as they are assigned after node 4 completes its transmission. Note that node 5 now has arbitration count number "1", node 6 has arbitration count number "2", and so forth through node 4 which now has arbitration count number "16". The arbitration count numbers shown in FIG. 4A were assigned in accordance with block 200B FIG. 3, following the completion of the transmission by node 4. That is, arbitration count numbers were assigned by subtracting the node number of the transmitting node from the node number of each node, modulo M.

Node 6 then waits (C(6)=6−4=2) for two quiet slots before beginning its transmission. After node 6 completes its transmission the assignment of arbitration count numbers is as shown in FIG. 4B. Note that node 7 now has arbitration count number "1", node 8 now has arbitration count number "2", and so forth through node 6 which now has been assigned arbitration count number "16". The arbitration count numbers were assigned as shown in block 200B of FIG. 3, following the completion of transmission by node 6. That is, arbitration count numbers were assigned by subtracting the node number of the transmitting node from the node number of each node, modulo M.

Node 9 (C(9)=9−6=3) then counts three quiet slots, in accordance with the assignments of arbitration count numbers shown in FIG. 4B, before beginning its transmission. After completion of the transmission by node 9 the arbitration count numbers are reassigned as shown in FIG. 4C. Note that node 10 now has been assigned arbitration count number "1", node 11 has arbitration count number "238", and so forth through node 9 which now has been assigned arbitration count number "16". Again, the arbitration count numbers depicted in FIG. 4C were assigned in accordance with block 200B in FIG. 3. That is, arbitration count numbers were assigned by subtracting the node number of the transmitting node from the node number of each node, modulo M.

Node 15 now counts (C(15)=15−9=6) six quiet slots before beginning its transmission, in accordance with the assignment of the arbitration count numbers as depicted in FIG. 4C. That is, arbitration count numbers were assigned by subtracting the node number of the transmitting node from the node number of each node, modulo M.

The first alternative embodiment and the second alternative embodiment of the invention lead to the same result for the computation of the new arbitration number of a node. The first and second alternative embodiments are simply different ways of looking at the invention.

Performance

The performance of the invention in terms of the effective bandwidth available for message transmission on bus 100 may be predicted by a simple analytical method. Details of an exemplary embodiment of the invention must be assumed in order to proceed with an analytical prediction of effective bandwidth. The length of the bus is assumed to be 100 meters, and the velocity of an electrical pulse on bus 100 is assumed to be 0.2 meters/nanoseconds. Travel time from one end of the bus to the other is then (100 meter/0.2 meter/nanosecond=500 nanoseconds) 0.5 microseconds. To this must be added the delay of the interface electronics which is also about 0.5 microseconds. Accordingly, the time period for a quiet slot in this particular embodiment is chosen to be approximately 1.14 microseconds, in agreement with the value mentioned above in connection with the system sold by the assignee of this patent application. N is the maximum number of nodes for the cluster. A cluster is a computer system consisting of a number of nodes communicating with each other through a bus. I is the identification number assigned to each node in a cluster, $I=0, 1, \ldots, N-1$. $C(I)$ is the arbitration count number assigned to each node I. A node I must wait for $C(I)$ quiet slots after it begins arbitration, as set forth in the flow chart in FIG. 3, before it can begin to transmit. The effective bandwidth, EB, is a measure of utilization of bus 100. Under saturation conditions the effective bandwidth, EB, is the ratio of time that bus 100 transmits packets to the total time required to both arbitrate and transmit packets. "Saturation condition" means that all nodes desire to transmit.

The effective bandwidth of bus 100 under saturation conditions can be calculated as follows: where the symbol Tt is the average transmission time of one packet in microseconds; Ta is the average arbitration time of one packet in microseconds; and b is the average size, in bytes, of one packet. The transmission time of 1 byte is 0.114 microseconds. The effective bandwidth is represented by the symbol EB, and EB has units of %. EB is given by the following expression:

$$EB = \frac{Tt}{Tt + Ta} * 100\%$$

$$EB = \frac{b*0.114}{b*0.114 + Ta} * 100\%$$

The effective bandwidth of the present invention may be compared with the effective bandwidth of the arbitration technique discussed hereinabove in the section "Background of the Invention" as disclosed in U.S. Pat. No. 4,560,985 issued on Dec. 24, 1985 to Strecker, et al.

Estimates for the average arbitration time of one packet, Ta, must be made under saturation conditions. For the invention, each node will wait 1 quiet slot before beginning transmission, giving for the average arbitration time Ta the following:

Ta = (quiet slot period) * (average # of quiet slots)
    = 1.14 microseconds * 1
    = 1.14 microseconds For the method set forth in the Strecker, et al. patent the average arbitration time Ta is given as follows:

Ta = (quiet slot period) * (best case average number of quiet slots)

Under saturation conditions, the next node to transmit will wait (I+1) quiet slots before beginning transmission, that is the "average # of quiet slots"=$(1+2+\ldots+16)/16$ Ta = 1.14 microseconds * (1+16)/2

Ta = 1.14 * 8.5 = 9.7 microseconds

The above value is for a system having 16 nodes. For a system having 32 nodes the same expression predicts Ta for the Strecker, et al. method, with a modification to the formula that 16 is replaced by 32, giving a Ta of 18.8 microseconds.

For a 32 node cluster the average arbitration time for the present invention, Ta, remains 1.14 microseconds as calculated hereinabove. Table 1 gives a comparison of effective bandwidths for 16 node clusters as a function of the average size in bytes, of one packet.

Table 2 gives a comparison of effective bandwidth, EB, for a 32 node cluster.

TABLE 1

| Bytes in message | 100 | 300 | 400 | 600 | 800 | 1000 |
|---|---|---|---|---|---|---|
| EB Invention | 91 | 95 | 98 | 98 | 99 | 99 |
| EB Strecker, et al. | 54 | 70 | 82 | 88 | 90 | 92 |

Table 1 - Comparison of EB, in %, for a 16 node cluster

TABLE 2

| Bytes in message | 100 | 300 | 400 | 600 | 800 | 1000 |
|---|---|---|---|---|---|---|
| EB Invention | 91 | 95 | 98 | 98 | 99 | 99 |
| EB Strecker, et al. | 38 | 55 | 71 | 78 | 83 | 86 |

Table 2 - Comparison of EB, in %, for a 32 node cluster

Note that the invention gives an improved effective bandwidth for all numbers of bytes in the message, both for 16 node clusters and for 32 node clusters. For example, for a message size of 100 bytes in a packet, the invention gives an EB of 91%, where in contrast the Strecker, et al. technique gives an EB of only 54%. For longer messages, for example, for a 1000 byte packet, the invention gives an EB of 99%, where in contrast the Strecker, et al. technique gives an EB of only 92%.

The comparison for a 32 node cluster shown in Table 2 leads to the following conclusion for a 100 byte sized packet, the invention gives an EB of 91%, where in contrast the Strecker, et al. technique gives an EB of only 38%. Also Table 2 shows that for longer messages both the invention and the Strecker, et al. technique give improved effective bandwidth. For example, for a message size of 1000 bytes in a packet, the invention gives an EB of 99%, where in contrast the Strecker, et al. technique gives an EB of only 86%.

The strategy as described herein-above, both for the disclosure of the Strecker, et al. patent and the present invention, is a "Carrier Sense Multiple Access with a Reservation" strategy (CSMA with a Reservation).

A summary of the invention, as described in FIG. 1, . . . FIG. 4, may be expressed as follows:

There are M nodes; the nodes are numbered using the symbol $I, I=0,1,\ldots M-1$; initial arbitration count numbers $C(I)$ are assigned as:

$$C(I) = I + 1$$

Therefore, values of C(I) run from 1 to M. The quiet slot with C(I)=0 is reserved for an immediate response after the bus becomes free. The quiet slot with C(I)=0 is, in an exemplary embodiment, assigned for transmission of an acknowledgment, ACK or NACK, by the receiving node.

Deaf Node Embodiment

Consider the problem of a new node which wishes to join in the arbitration and communicate with a set of nodes which have been communicating using the arbitration algorithm of the present invention. Since this new node had not been keeping an accurate knowledge of the arbitration on the shared bus, it does not know the proper value of its arbitration count. This node is called a "deaf node". A node may also become "deaf", that is, have an erroneous arbitration count, because of a component failure in its hardware.

If a "deaf node" were to use an arbitrary value for its arbitration count C(I), then it is possible that it would end up with the same arbitration count as another node which was functioning correctly. Such duplicate assignment of arbitration count may result in data collisions on the bus.

The problem of deaf nodes is solved by the strategy of adding a reserved slot for the deaf node into the assignment mechanism. A node which is "deaf", for whatever reason, may use the reserved slot to transmit its message. Upon detection of a carrier during the reserved slot each node in the system resets its arbitration count to I+1 as shown in FIG. 3 at block 130.

For a system having M nodes, any slot in the range 1 through M may be reserved for the deaf node. If the k'th slot is reserved for the deaf node, then any node whose arbitration count C(I) is greater than or equal to k is required to transmit in slot number C(I)+1, that is, it has to wait for one additional quiet slot. Hence, the choice of the deaf node slot involves the following design tradeoff: if a low number slot is reserved for the deaf node, then the deaf node will get an opportunity to transmit quicker; if a high number slot is reserved for the deaf node then the average time spent in arbitration will be less.

The deaf node strategy can also be used to reset the clocks of all the nodes if the idle time on the bus exceeds the reset time. The first node that comes to block 150 in FIG. 3 and detects that the elapsed time exceeds reset time can send a message in the deaf node slot. This message causes all nodes to initialize their arbitration counts as in block 130 in FIG. 3.

As a further example, the apparatus may, upon detection of a preassigned number of successive data collisions, transmit during the deaf node slot and reset the arbitration count numbers as shown in FIG. 3 at block 130. Resetting the arbitration count numbers as shown in FIG. 3 at block 130 corrects any error which may have crept into the assignment of arbitration count numbers.

Figure 5:
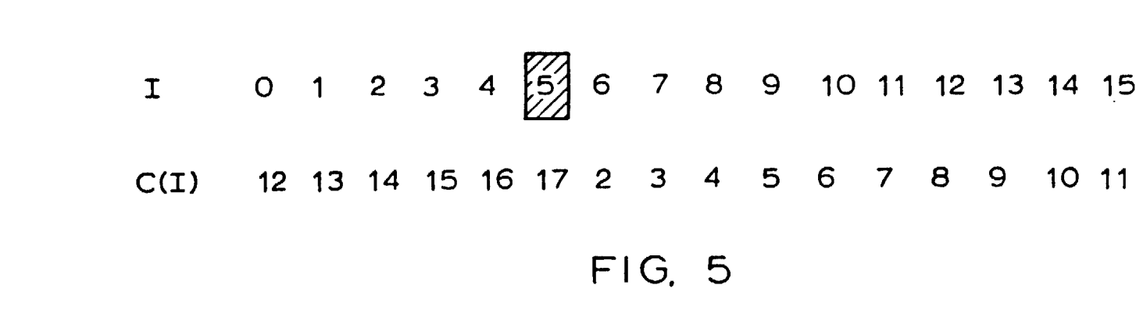
FIG. 5 is a state diagram of an arbitration apparatus having quiet slots 0 and 1 reserved.

FIG. 5 shows an assignment of arbitration count numbers, wherein arbitration count number "0", and arbitration count number "1" are both reserved. Here the 0th slot is, as usual, reserved for the immediate acknowledge message, and the 1st slot is reserved for a deaf node. Node 5 has just transmitted and node 6 must wait two quiet slots before beginning transmission, node 7 must wait for three quiet slots, and et cetera.

Collision Frequency

Figure 6:
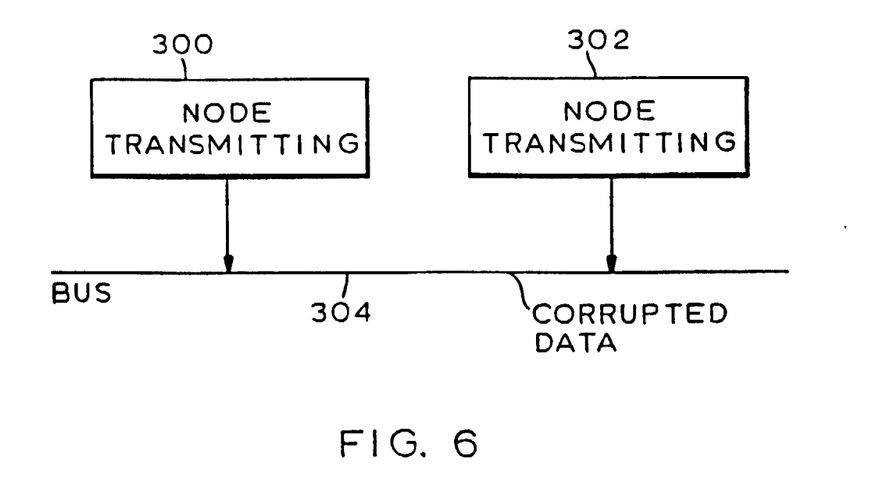
FIG. 6 is a block diagram showing two nodes attempting to simultaneously transmit and so placing corrupted data on the bus.

When two separate transmissions occur during one quiet slot, then a data collision occurs. FIG. 6 shows two message transmissions occurring in one quiet slot, and hence a data collision. Node 300 and node 302 are both attempting to transmit on bus 304 at the same time, and so the data on bus 304 is corrupted.

As noted above, the approach of the present invention to handling data collisions is the Carrier Sense Multiple Access With A Reservation Strategy (CSMA with a Reservation Strategy). The CSMA with a Reservation strategy of the present invention greatly reduces the data collision probability from the collision frequency experienced in the ordinary CSMA/CD protocol utilized in the ETHERNET protocol. In fact, if all the nodes are equipped with perfect clocks, and no components of the system fail, then during ordinary operation the probability of data collision in the present invention is zero.

In contrast to the present invention, the technique of Strecker et al. does exhibit some probability of data collisions during ordinary operation. The probability of data collision for the technique of Strecker et al. is given by the following expression, where the symbols have the following meanings:

$T$ = mean time between requests for one node, $QS$ = length in time of one quiet slot, $M$ = Number of nodes $P$ = probability that two requests fall within one quiet slot.

$$P = (M-1)(1 - e(-2\ QS/T)).$$

A sufficient approximation is, $$P = 2(M-1)\ QS/T.$$

A numerical example for the probability of data collision is, in a situation having the following assumed values of the parameters:

There are 16 nodes, M=16; QS, the length of a quiet slot, is 1.14 microseconds; and T=7,500 microseconds (the apparatus is approximately 45% busy), then:

$$P = 0.004.$$

That is, in a 16 node system having the parameters as given above, the probability of a data collision during ordinary operation is 0.004.

The collision detection apparatus in each node detects the event of the occurrence of a data collision, and the nodes then respond in accordance with a predetermined response. For example, the exponential backoff response utilized in the ETHERNET CSMA/CD backoff protocol could be used or, as a further example, the nodes could have their arbitration count number reinitialized as shown in FIG. 3 at block 130.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An improved arbitration apparatus for a computer network of the type having a plurality of communicating nodes, said nodes communicating by a shared bus, said nodes monitoring a carrier signal on said bus, the presence of said carrier signal indicative that another node is transmitting on said bus, said nodes being assigned an initial unique arbitration count number, an improved arbitration apparatus located in each said node, said improved arbitration apparatus comprising:

means, responsive to an absence of said carrier signal on said bus, for each said node of said plurality of nodes to count a number of predetermined time intervals, said predetermined time interval hereinafter referred to as a quiet slot, and for each said node to compare a number of counted quiet slots with said arbitration count number of each said node;

means, responsive to said number of counted quiet slots equaling said arbitration count number, for each said node to determine whether said node has a transmit request, and to begin transmission of a message on said bus if said transmit request is present;

means in each said node, responsive to a presence of the carrier signal before the member of counted quiet slots equals its arbitration count number, for changing said arbitration count number of each node of said plurality of nodes.

2. The apparatus as in claim 1 wherein said apparatus for changing said arbitration count number further comprises:

means in each said node for counting the number of quiet slots between said node detecting the absence of carrier signal on the system bus and said node detecting the presence of said carrier signal on said bus, said counted number of quiet slots equaling a number of quiet slots counted by a winning node;

means for computing a new arbitration count number for each said node by subtracting said number of quiet slots counted by a winning node from said node's arbitration count number using arithmetic modulo the number of said plurality of nodes in said system.

3. The apparatus as in claim 2 wherein the apparatus for computing a new arbitration count number further comprises:

the number of said plurality of nodes in the system is represented by N;

the number of quiet slots counted by a winning node is represented by C;

the new arbitration count number is computed as (current arbitration number − C) modulo N.

4. The apparatus as in claim 1 wherein said apparatus for changing said arbitration count number comprises:

means in each said node responsive to the message on said bus for determining a node number of a winning node of said plurality of nodes;

means for computing a new arbitration count number for each said node by subtracting said node number of said winning node of said plurality of nodes from a node number assigned to said each said node, using arithmetic modulo a number of said plurality of nodes in said system.

5. The apparatus as in claim 4, wherein said means for each said node for determining a node number of a winning node of said plurality of nodes further comprises:

means in each said node of said plurality of nodes to receive a message transmitted by said winning node of said plurality of nodes;

means in each said node to extract from said message said node number of said winning node.

6. The apparatus as in claim 4 wherein the apparatus for computing a new arbitration count number further comprises:

the number of said plurality of nodes in the system is represented by N;

the node number of said winning node of said plurality of nodes is represented by C;

the new arbitration count number is computed as (current arbitration number − C) modulo N.

7. A method for arbitrating for a node in a computer system having a plurality of nodes sharing a bus; each said node being assigned an initial unique arbitration count number; each said node testing for a carrier signal on said bus, the presence of said carrier signal indicative that another node is transmitting on said bus, comprising the steps of:

counting, in each said node, in response to an absence of said carrier signal on said bus, a number of predetermined time intervals, said predetermined time interval hereinafter referred to as a quiet slot; comparing, in each said node, a number of counted quiet slots with said arbitration count number of said node;

testing, in each said node, in response to said number of counted quiet slots equaling said arbitration count number, for whether said node has a message to transmit, and beginning transmission on said bus if said message is present;

changing, in response to a presence of the carrier signal before the number of counted quite slots equals its arbitration count number, said arbitration count number of each node of said plurality of nodes.

* * * * *